United States Patent Office 2,969,358
Patented Jan. 24, 1961

2,969,358
2-CHLORO-10-PHENOTHIAZINECARBONYL-PIPERAZINES

John W. Cusic, Skokie, Ill., assignor to G. D. Searle & Co., Chicago, Ill., a corporation of Delaware No Drawing. Filed Dec. 8, 1958, Ser. No. 778,588

5 Claims. (Cl. 260—243)

This invention relates to halogenated 10-phenothiazine-carbonylpiperazines. More particularly, this invention relates to compounds of the formula

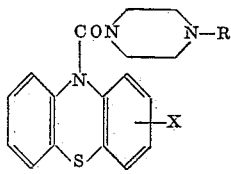

wherein R represents hydrogen or an alkyl, hydroxy-alkyl, or optionally halogenated alkanoyloxyalkyl radical; and X represents halogen.

Among the alkyl radicals comprehended by R in the foregoing formula, especially lower alkyl groupings are preferred. Examples of such radicals are methyl, ethyl, propyl, isopropyl, butyl, isobutyl, sec-butyl, tert-butyl, pentyl, isopentyl, tert-pentyl, neopentyl, hexyl, isohexyl, heptyl, octyl, and homologous monovalent hydrocarbon radicals embracive of fewer than 9 carbon atoms arranged in chains, either straight or branched.

The substituted alkyl radicals referred to by R in the formula likewise are desirably of lower order, and may be thought of as derived by replacing, in an alkyl radical comprising up to and including 8 carbon atoms, 1 of the hydrogens with an alcohol or appropriate ester function. The esterifying moieties called for are those normally evolved from alkanoic or haloalkanoic acid, as aforesaid, but especially radicals of the formula

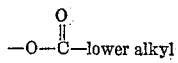

and the chloroacetyl radicals. Illustrative of hydroxy (lower alkyl) and lower alkanoyloxy(lower alkyl) radicals optimally adapted to the purposes of this invention are hydroxymethyl, 2-hydroxyethyl, 3-hydroxypropyl, 1-(hydroxymethyl)propyl, 5-hydroxypentyl, and corresponding groupings wherein the indicated hydroxyl is replaced, ad libitum, by acetoxy, propionyloxy, butyryl-oxy, or like radicals.

The halogens depicted by X in the introductory formula for compounds of this invention are specifically fluorine, chlorine, bromine, and iodine in any of the positions 1 through 4 as shown. However, a 2-chloro substituent is the one of choice.

Equivalent to the foregoing basic amides and likewise within the ambit of invention disclosed are non-toxic acid addition and quaternary ammonium salts of the described compounds, the compositions of which may be symbolized by

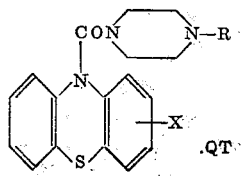

wherein R and X have the meanings previously assigned; Q is selected from among hydrogen and lower alkyl, hydroxy(lower alkyl), and lower alkenyl radicals, as also such aralkyl radicals as benzyl, phenethyl, and naphthyl-methyl; and T is 1 equivalent of an anion—for example, chloride, bromide, iodide, nitrate, phosphate, sulfate, sulfamate, methyl sulfate, ethyl sulfate, benzenesulfonate, toluenesulfonate, acetate, lactate, succinate, malate, maleate, tartrate, citrate, gluconate, ascorbate, benzoate, cinnamate, or the like—which, in combination with the cationic portion of a salt aforesaid, is neither pharmacologically nor otherwise undesirable in pharmaceutical dosage.

The compounds to which this invention relates are useful because of their valuable pharmacological properties. Primarily, they are antispasmodic agents; but they also manifest assorted antibiotic activities against such recognized test organisms as *E. coli*, *B. subtilis*, and *Trichophyton mentagrophytes*; and they are further characterized by barbiturate-potentiating and eurhythmic properties.

The claimed compounds can be variously manufactured, but a preferred procedure consists in contacting 2-chloro-10-chloroformylphenothiazine with piperazine in a ketonic medium for as long as several hours at elevated temperatures to produce 1-(2-chloro-10-phenothiazinecarbonyl)-piperazine, which in turn is converted to the corresponding N-(lower alkyl) or N-hydroxy(lower alkyl) derivative by interaction with an appropriate alkyl chloride or chloroalkanol. Suitable solvents for this conversion are ethanol, butanone, toluene, dimethylformamide, and the like, a representative set of conditions for the contemplated preparation being 16–20 hours at reflux temperatures in butanone medium. An acid acceptor such as potassium carbonate and a catalyst such as sodium iodide may be incorporated in the reaction mixture if desired. As an exception to this procedure, formic acid and formaldehyde are heated with 1-(2-chloro-10-phenothiazinecarbonyl)piperazine to give the N-methyl derivative; and ethylene oxide is substituted for 2-chloroethanol as detailed in Example 4 hereinafter to give the N-(2-hydroxy-ethyl) composition. From the N-alkanolic materials, the corresponding esters are obtained by treatment with selected acid halides in inert solvents such as benzene, toluene, ether, or mixtures thereof.

Conversion of the amide bases of this invention to corresponding acid addition salts is accomplished by simple admixture of these compounds with 1 equivalent of any of various inorganic and strong organic acids, the anionic portion of which conforms to T as hereinabove defined.

The quaternary ammonium compounds comprehended by this invention are those derived by contacting a claimed base with 1 equivalent of an organic ester of the formula

Q—T

Q and T being limited by the meanings hereinbefore assigned, and it being additionally provided that Q is not hydrogen. Quaternization takes place in the temperature range between 25° and 200° centigrade, using an inert solvent such as chloroform, acetone, butanone, methanol, butanol, or the like as reaction medium. Quaternization is ordinarily completed in from 1 to 48 hours and is generally carried out in a closed system if a lower alkyl halide—such as methyl chloride—is one of the reagents. Using methyl bromide, the manufacture of quaternary salts may be smoothly effected in butanone solution at 70° centigrade, the reaction time being approximately 1 hour.

The following examples describe in detail certain of the compounds illustrative of the present invention and methods which have been devised for their manufacture. However, the invention is not to be construed as limited thereby, either in spirit or in scope, since it will be apparent to those skilled in the art of organic synthesis that many modifications, both of materials and of methods, may be practiced without departing from the purpose and intent of this disclosure. In the examples hereinafter detailed, temperatures are given in degrees centigrade and relative amounts of materials in parts by weight, except as otherwise noted.

*Example 1*

(A) *1 - (2 - chloro - 10 - phenothiazinecarbonyl)-piperazine.*—To a solution of 35 parts of piperazine in 500 parts of butanone at the boiling point under reflux is slowly added, with agitation, a solution of 53 parts of 2-chloro-10-chloroformylphenothiazine in 800 parts of butanone. When the addition is complete, heating at the boiling point with agitation is maintained for 2 hours longer, following which the reactants are cooled and filtered. The filtrate is stripped of solvent by vacuum distillation, and the oil which remains is taken up in benzene. The benzene solution is washed with aqueous dilute potassium hydroxide, and then washed to neutrality with water. Finally, the solution is dried over anhydrous potassium carbonate and freed of solvent by distillation in vacuo. There is obtained by this procedure the desired 1-(2-chloro-10-phenothiazinecarbonyl)-piperazine, the formula of which is

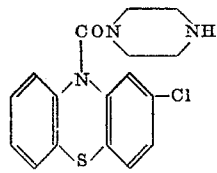

(B) *1 - (2 - chloro - 10 - phenothiazinecarbonyl)piperazine hydrochloride.*—To a benzene solution of the basic amide of the foregoing part A of this example is added a slight excess of hydrogen chloride dissolved in 2-propanol. The solid which precipitates is 1-(2-chloro-10-phenothiazinecarbonyl)piperazine hydrochloride. Recrystallized from a mixture of methanol and benzene, the product melts at approximately 262–263°.

*Example 2*

(A) *1 - (2 - chloro - 10 - phenothiazinecarbonyl)-4-methylpiperazine.*—Approximately 10 parts of 1-(2-chloro-10-phenothiazinecarbonyl)piperazine is heated at 60–70° for 15 hours with 18 parts of formic acid and 10 parts of aqueous 35% formaldehyde. The resultant solution is freed of solvent by evaporation, and the residual oil is taken up in ether. The ether solution is washed with aqueous dilute sodium hydroxide and then with water until the washings are neutral to litmus. Upon distillation of solvent, there is obtained as the residue, 1 - (2 - chloro - 10 - phenothiazinecarbonyl) - 4 - methylpiperazine. The product has the formula

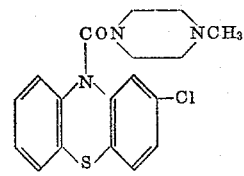

(B) *1 - (2 - chloro - 10 - phenothiazinecarbonyl)-4-methylpiperazine hydrochloride.*—To an ethanolic solution of 1 - (2 - chloro - 10 - phenothiazinecarbonyl)-4-methylpiperazine is added a slight excess of hydrogen chloride dissolved in 2-propanol. 1-(2-chloro-10-phenothiazinecarbonyl)-4-methylpiperazine hydrochloride precipitates. Filtered off and recrystallized from a mixture of ethanol and ethyl acetate, the product melts in the range 235–240°.

*Example 3*

*1 - (2 - chloro - 10 - phenothiazinecarbonyl) - 4-pentyl-piperazine.*—A mixture of 173 parts of 1-(2-chloro-10-phenothiazinecarbonyl)piperazine, 80 parts of pentyl bromide, 20 parts of sodium iodide, 100 parts of triethylamine, and 320 parts of butanone is heated at the boiling point under reflux with agitation for 12 hours. The mixture is then filtered, and the filtrate is stripped of solvent by evaporation. The residue is taken up in benzene, and the benzene solution is washed well with water and then dried over anhydrous potassium carbonate. Distillation of solvent leaves as the residue 1-(2-chloro-10-phenothiazinecarbonyl)-4-pentylpiperazine, the formula of which is

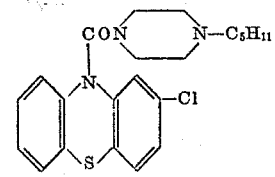

*Example 4*

(A) *1 - (2 - chloro - 10 - phenothiazinecarbonyl) - 4-(2-hydroxyethyl)piperazine.*—A solution of 48 parts of 1-(2-chloro-10-phenothiazinecarbonyl)piperazine in approximately 200 parts of benzene is diluted with approximately 300 parts of ethanol and chilled to 0°. At this temperature, 12 parts of ethylene oxide is introduced, following which the reactants are heated at 75° for 72 hours in a sealed vessel. The resultant solution is concentrated by distillation and then diluted with water to the cloudpoint. The oil which precipitates is separated and taken up in a mixture of benzene and ether. The benzene-ether solution is washed with water, dried over anhydrous potassium carbonate, and stripped of solvent by distillation. There remains 1-(2-chloro-10-phenothiazinecarbonyl)-4-(2-hydroxyethyl)piperazine, of the formula

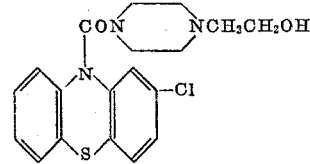

(B) *1 - (2 - chloro - 10 - phenothiazinecarbonyl) - 4-(2-hydroxyethyl)piperazine hydrochloride.*—To a chloroform solution of 1-(2-chloro-10-phenothiazinecarbonyl)-4-(2-hydroxyethyl)piperazine is added a slight excess of hydrogen chloride dissolved in 2-propanol. The resultant solution is dumped into ether. The solid which precipitates is filtered off and recrystallized from a mixture of methanol and benzene. The 1-(2-chloro-10-phenothiazinecarbonyl)-4-(2-hydroxyethyl)piperazine hydrochloride thus obtained melts at 230–232°.

*Example 5*

*1 - (2 - chloro - 10 - phenothiazinecarbonyl) - 4 - (3-hydroxypropyl)piperazine.*—Substitution of 50 parts of 3-chloropropanol for the 80 parts of pentyl bromide called for in Example 3 affords by the procedure therein detailed 1 - (2 - chloro - 10 - phenothiazinecarbonyl) - 4 - (3 - hydroxypropyl)piperazine, the formula of which is

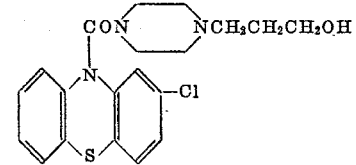

*Example 6*

*1 - (2 - acetoxyethyl) - 4 - (2 - chloro - 10 - phenothiazinecarbonyl)piperazine hydrochloride.*—To a solution of approximately 9 parts of 1-(2-chloro-10-phenothiazinecarbonyl)-4-(2-hydroxyethyl)piperazine in 40 parts of chloroform is added 3 parts of acetyl chloride. The resultant mixture is let stand for 1 hour, whereupon a slight excess of hydrogen chloride dissolved in 2-propanol is introduced. The resultant mixture is dumped into ether, and the solid which precipitates is separated and further purified by dissolution in dimethylformamide and precipitation therefrom with ether. The 1-(2-acetoxyethyl)-4-(2 - chloro-10-phenothiazinecarbonyl)piperazine hydrochloride thus obtained melts at approximately 228–229° and has the formula

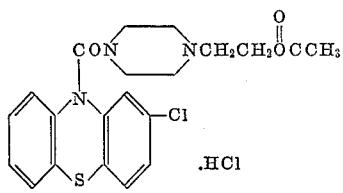

*Example 7*

*1 - (2 - chloroacetoxyethyl) - 4 - (2 - chloro - 10-phenothiazinecarbonyl)piperazine hydrochloride.*—Substitution of 3 parts of chloroacetyl chloride for the 3 parts of acetyl chloride called for in Example 6 affords by substantially the procedure there detailed 1-(2-chloroacetoxyethyl) - 4 - (2 - chloro - 10 - phenothiazinecarbonyl)-piperazine hydrochloride. The product is purified by dissolution in chloroform and precipitation therefrom with ether. 1 - (2 - chloroacetoxyethyl)-4-(2-chloro-10-phenothiazinecarbonyl)piperazine hydrochloride melts at 166–168° and has the formula

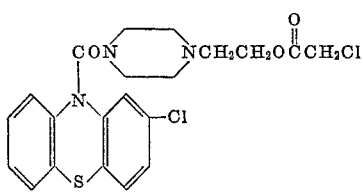

*Example 8*

*1 - (2 - chloro - 10 - phenothiazinecarbonyl) - 4 - (3-propionyloxypropyl)piperazine.*—A mixture of 8 parts of 1 - (2 - chloro - 10 - phenothiazinecarbonyl) - 4 - (3 - hydroxypropyl)piperazine, 3 parts of propionyl chloride, 5 parts of triethylamine, and 75 parts of chloroform is let stand for 1 hour, then washed well with water and dried over anhydrous potassium carbonate. Upon removal of solvent by distillation, there is obtained 1-(2-chloro-10-phenothiazinecarbonyl) - 4 - (3 - propionyloxypropyl)-piperazine, of the formula

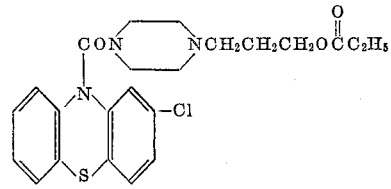

What is claimed is:

1. A compound of the formula

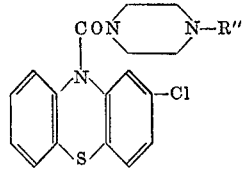

wherein R'' is a hydroxy (lower alkyl) radical.

2. 1 - (2 - chloro - 10 - phenothiazinecarbonyl) - 4 - (2-hydroxyethyl)piperazine.

3. A compound of the formula

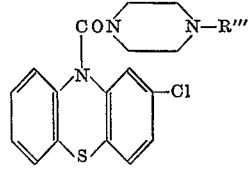

wherein R''' is a lower alkanoyloxy (lower alkyl) radical.

4. 1 - (2 - acetoxyethyl) - 4 - (2 - chloro - 10 - phenothiazine-carbonyl)piperazine.

5. 1 - (2 - chloroacetoxyethyl) - 4 - (2 - chloro - 10 - phenothiazinecarbonyl)piperazine.

References Cited in the file of this patent

UNITED STATES PATENTS

| 2,591,679 | Cusic | Apr. 8, 1952 |
| 2,643,255 | Morren | June 23, 1953 |
| 2,676,971 | Cusic | Apr. 27, 1954 |
| 2,776,971 | Cusic | Jan. 8, 1957 |

FOREIGN PATENTS

| 998,190 | France | Sept. 19, 1951 |

OTHER REFERENCES

Dahlbom: Acta Chem. Scand., vol. 7, pp. 879–883 (1953).

Schering: Abstract of Australian Patent 23,597/57, 1 page, May 30, 1957.

Sherlock: Abstracts of Papers, 131st Meeting of Am. Chem. Soc., Apr. 9, 1957, pp. 18N, 19N.